INVENTOR.
Harry Haber

INVENTOR.
Harry Haber

Patented June 8, 1943

2,321,080

UNITED STATES PATENT OFFICE 2,321,080

LIGHT TRAP FOR PROJECTORS

Harry Haber, New York, N. Y.

Application May 16, 1941, Serial No. 393,697

6 Claims. (Cl. 88—24)

The present invention relates broadly to optics and more especially to a light guard adapted for use with home projecting apparatus.

The invention is herewith illustrated as being associated with a moving picture machine for home use, but it is to be understood that it applies with equal facility to projectors of still pictures.

The vast majority of projectors, especially moving picture projectors for home use, are provided with vertical lamp houses, the upper ends of which are open to facilitate the outflow of a blast of air which is circulated past the high intensity incandescent lamp by a blast producing fan in order to keep the lamp and lamp housing cool. The open end of the lamp housing permits the upward escape of light as well as air. This upwardly escaping light is very annoying especially when it strikes a white ceiling and is reflected downwardly in the eyes of the audience which may be in the rear of the projector. It is particularly annoying to the operator who often stands above and near the projector so that the light escaping through the upper opening in the lamp housing strikes the face of the operator.

The present invention overcomes the above difficulties by providing an attachment comprising a removable light trap.

Other and further objects of the invention will in part be obvious and will in part be pointed out hereinafter by reference to the accompanying drawings.

It is to be understood that the disclosure herewith is illustrative of the preferred embodiment of my invention, but it is not to be understood in the limiting sense in that the invention may be embodied in forms which vary from the specific disclosure herewith.

Figure 1:
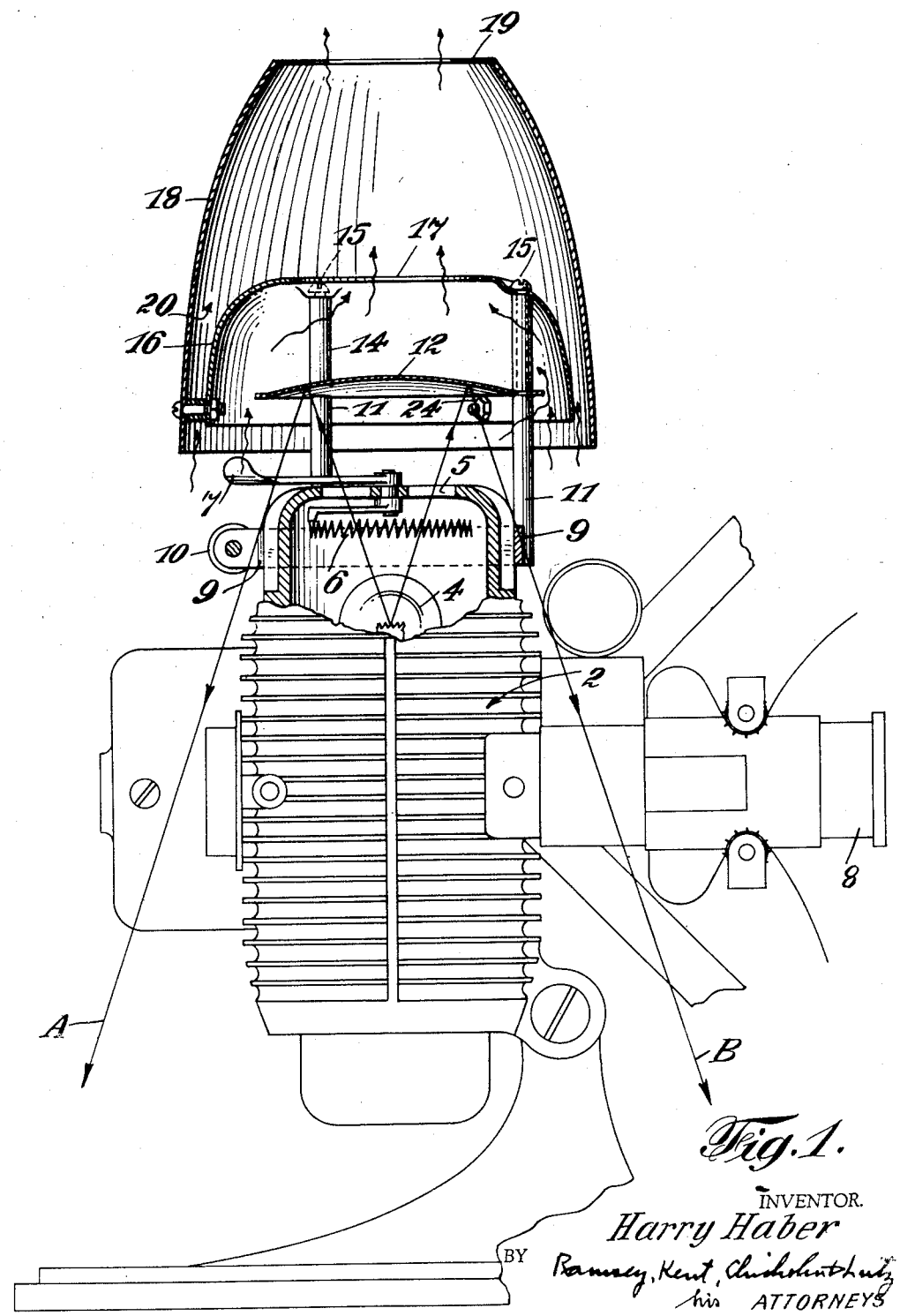
Fig. 1 is a sectional view through the light trap in accordance with the present invention and illustrates more or less diagrammatically a form of moving picture projector with which the light trap is associated.
Figure 3:
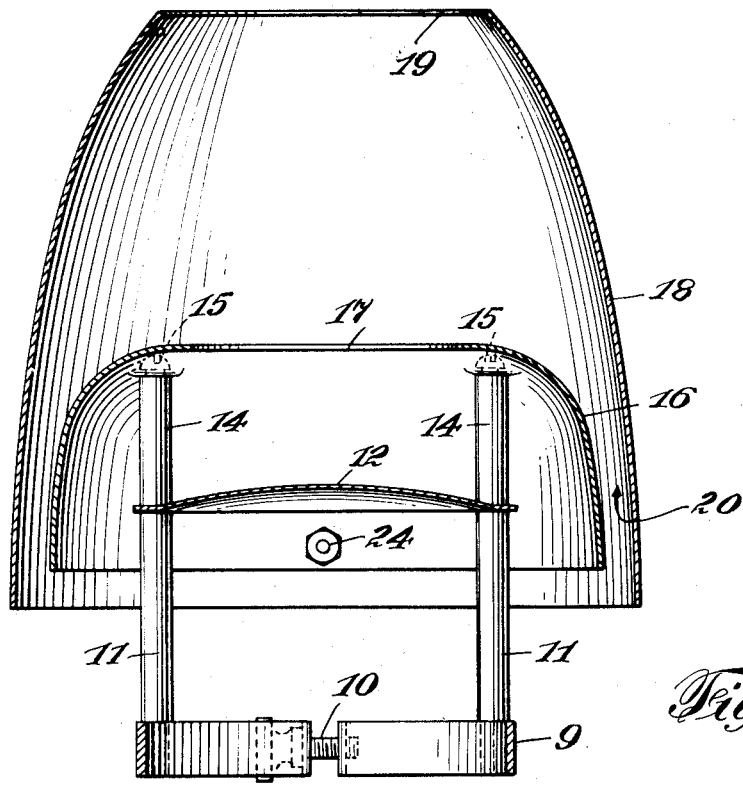
Fig. 3 is a section taken on a plane represented by line 3—3 of Fig. 2.
Figure 2:
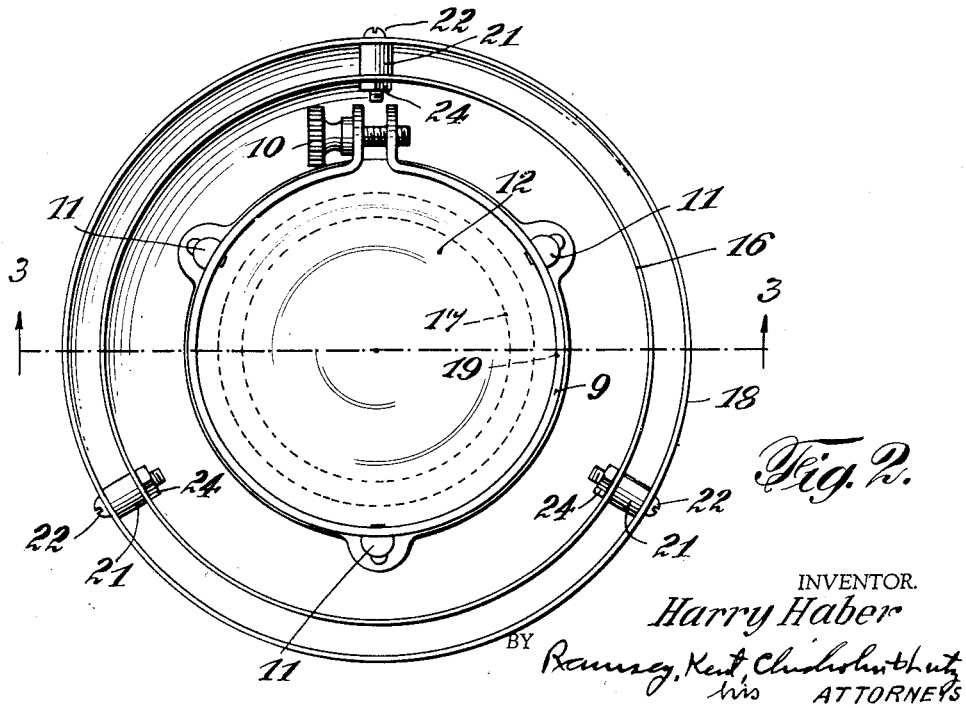
Fig. 2 is a plan view looking directly at the under portion of the light trap.

The projector 1 is a well known type of moving picture projector known in the art as "Filmo" and is chosen to illustrate a common type of amateur moving picture projector. This projector 1 is provided with a vertical lamp house 2 within which is mounted a high intensity incandescent electric lamp 4 that not unusually has a power of 750 watts to 1000 watts. Such a lamp throws off so much heat that in order to prevent melting of the glass of the lamp bulb and overheating the lamp house and other parts, it becomes necessary to forcefully circulate air through the lamp housing. This is usually accomplished in the art by utilizing the motor adapted to drive the moving picture mechanism to drive a fan that draws in air and forces it through the lamp housing 2. The lamp housing is open at the top at 5 to permit the outflow of this blast of air. In many forms of projectors a lamp rheostat 6 is also mounted adjacent this opening and is cooled by the blast of air which also cools the lamp. The rheostat is operated by the handle 7 to increase or decrease the amount of current on the lamp and thereby vary its brilliance as the occasion requires. The open end 5 of the lamp housing 2 permits rays of light from the high intensity lamp within the lamp housing 4 to escape in a vertical direction. These rays of light escaping through the opening 5 are extremely annoying in that they strike the ceiling of the room and illuminate the room where the pictures are being shown, thereby detracting from the brilliancy of the pictures on the screen. Also, these rays of light interfere with an operator standing back of the projector and attempting to focus the pictures by means of the adjustable lens 8.

The present invention comprises a light trap adapted to trap and divert these rays of light escaping through the air opening in the lamp housing. In its specific form, it comprises an attaching member which is formed to fasten upon some part of the machine to properly hold the light trap in position. In the specific embodiment disclosed herewith, the attaching member comprises an adjustable metal band 9 adapted to slip over the upper end of the lamp housing 2 and to be clamped around the lamp housing by utilizing the clamp screw 10 to draw the ends of the band straight together. This supporting member or clamp band carries upstanding posts 11, three of which are shown in the present embodiment and these posts support a plate 12 comprising a light shield. This light shield 12 is preferably formed of metal having the surface on its under side polished, or frosted to comprise a reflector and the shield is of such size as to intercept the rays passing upwardly through the open end 5 of the lamp housing. Tubular spacers 14 extend upwardly over each upstanding post 11 and comprise tubular supports through which machine screws 15 extend to be screw threaded into the upper ends of the upstanding posts. These tubular spacers 14 support a shield bell 16 that is provided with an opening 17 directly over the light shield 12. The edges of the light shield 12 are spaced from the side walls of the shield bell 16 a sufficient distance to afford a free circulation of air around the light shield and through the opening 17 in the shield bell. An air bell 18 provided with an opening 19 is mounted over the shield bell 16 to provide an additional air space 20 between the air bell and the shield bell. The air bell is carried by the skirt of the shield bell by means of tubular spacing members 21 through which machine screws 22 pass to nuts 24 on the interior of the shield bell. It will be observed that the lower end of the air bell is sufficiently above the upper end of the lamp house to enable the operator to reach under the edge of the bell to operate the handle 7 of the rheostat 6.

All light escaping upwardly through the opening 5 in the lamp housing 2 strikes the reflector on the under surface of the light shield 12. This light is diffused and reflected downwardly around the lamp housing as a soft dim light indicated by arrows A and B. Such soft dim light is very useful to the operator in enabling the operator to observe objects lying on the projector table and to permit the operator to observe the operation of the machine. It is not unusual for an operator to be preparing a second reel for projection while the first reel is being run. This light reflected downwardly is of such low light intensity as to be of no annoyance whatever to the operator or to the audience. The light trap, however, operates efficiently to completely block any upward flow of light, and thereby obviates the unpleasant effects of such vertically escaping light. The light shield, however, does not in any way interfere with the free flow of warm air from the lamp housing; as a matter of fact, the aspirating effect of the air flowing between the two bells as indicated by the arrows C and the general structure of the light trap, acts as an additional chimney which facilitates rather than retards the flow of light from the lamp housing.

What I claim is:

1. A light trap for a home use projector having a lamp housing with an open upper end through which light rays normally escape in an upward direction when said projector is in normal operation, said light trap comprising attaching means adapted to be secured to a portion of said projector, a light shield mounted upon said attaching means and arranged above the open end of said lamp housing of said projector to intercept said light rays normally escaping in an upward direction through said opening, a shield bell arranged above and around said light shield in such manner as to provide an air passage around said light shield for heated air escaping through said opening in said lamp housing, and an air bell mounted over and above said shield bell to provide additional air passages to facilitate the escape of heated air issuing through the opening in the lamp housing, said shield bell and said air bell being provided with openings through which said heated air may escape.

2. A light trap for a home use projector having a lamp housing with an open upper end through which light rays normally escape in an upward direction when said projector is in normal operation, said light trap comprising a constructing band adapted to be secured to a portion of said projector, a light shield mounted upon said constructing band and arranged over the open end of said lamp housing of said projector to intercept said light rays normally escaping in an upward direction through said opening, the under portion of said light shield comprising a light reflecting surface, a shield bell arranged above and around said light shield in such manner as to provide an air passage around said light shield for heated air escaping through said opening in said lamp housing, and an air bell mounted over and above said shield bell to provide additional air passages to facilitate the escape of heated air issuing through the opening in the lamp housing, said shield bell and said air bell being provided with openings through which said heated air may escape.

3. A light trap for a home use projector having a lamp housing with an open upper end through which light rays normally escape in an upward direction when the projector is in operation, said light trap comprising attaching means to secure the same to the projector, upstanding posts carried by said attaching means, a light shield carried by said upstanding posts and located above said lamp housing in such manner as to intercept the rays of light which normally would escape in an upward direction through the opening in the upper end of the lamp housing, and substantially vertical air channel means to guide heated air flowing through said lamp housing around said light shield during the normal operation of said home use projector.

4. A light trap for a home use projector having a lamp housing with an open upper end through which light rays normally escape in an upward direction when said projector is in operation, said light trap comprising attaching means adapted to be secured to said projector, a light shield carried by said attaching means and located above said open end of said lamp housing in such manner as to intercept light rays normally escaping in a vertical direction from said lamp housing, the under portion of said light shield comprising a reflecting surface adapted to reflect said light rays downwardly over said projector and outside of said lamp housing.

5. A light trap for a home use projector having a lamp housing with a draft opening through which light rays normally escape in an upward direction when said projector is in operation, said light trap comprising attaching means adapted to be secured to the lamp housing of said projector, a light shield carried by said attaching means and located outside of said lamp housing above said draft opening in such manner as to intercept light rays normally escaping through the draft opening in said lamp housing, the under portion of said light shield comprising a reflecting surface adapted to reflect said light rays downwardly and outside of said lamp housing.

6. A light trap for a home use projector having a draft opening in the lamp house, means to support a light shield mounted outside of said lamp house to intercept light passing through said opening, the under portion of said light shield comprising a reflecting surface to reflect the major portion of said intercepted light downward outside of said lamp house, and means above said shield to comprise a chimney for heated air passing through said opening in said lamp house.

HARRY HABER.